US006587960B1

(12) United States Patent
Barford et al.

(10) Patent No.: US 6,587,960 B1
(45) Date of Patent: Jul. 1, 2003

(54) SYSTEM MODEL DETERMINATION FOR FAILURE DETECTION AND ISOLATION, IN PARTICULAR IN COMPUTER SYSTEMS

(75) Inventors: Lee Alton Barford, San Jose, CA (US); Christian Zurhorst, Aidlingen (DE)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/481,077

(22) Filed: Jan. 11, 2000

(51) Int. Cl.[7] ............................................... G06F 11/00
(52) U.S. Cl. ........................................................ 714/8
(58) Field of Search ............................. 714/8, 25, 26, 714/33, 38, 37; 703/17, 18

(56) References Cited

U.S. PATENT DOCUMENTS

| | | | | |
|---|---|---|---|---|
| 4,632,802 A | * | 12/1986 | Herbst et al. ............... 376/216 |
| 5,099,436 A | * | 3/1992 | McCown et al. ........... 364/550 |
| 5,157,667 A | * | 10/1992 | Carusone, Jr. et al. ..... 371/29.1 |
| 5,157,668 A | | 10/1992 | Buenzli, Jr. et al. ....... 371/15.1 |
| 5,161,158 A | | 11/1992 | Chakravarty et al. ...... 371/15.1 |
| 5,187,773 A | * | 2/1993 | Hamilton et al. ............ 395/10 |
| 5,195,095 A | | 3/1993 | Shah .......................... 371/15.1 |
| 5,216,749 A | * | 6/1993 | Hamilton ..................... 395/10 |
| 5,297,150 A | * | 3/1994 | Clark .......................... 371/19 |
| 5,353,381 A | * | 10/1994 | Hamilton et al. ............ 395/10 |
| 5,448,722 A | * | 9/1995 | Lynne et al. ................. 395/60 |
| 5,922,079 A | * | 7/1999 | Booth et al. ................. 714/26 |
| 6,321,187 B1 | * | 11/2001 | Squier et al. ................ 703/18 |

OTHER PUBLICATIONS

European Search Report, European Patent Office, Examiner L. Sarasua, Completed Mar. 16, 2001.

\* cited by examiner

Primary Examiner—Nadeem Iqbal (57) ABSTRACT

Disclosed is a method for determining a system model describing a relation between applicable tests and components of a system under test (SUT). The system model is applicable in conjunction with actual test results for determining at least one fault candidate representing a specific component of the SUT likely to have caused a fault of the SUT. The method system model of the SUT is determined by determining configuration information describing the actual set of components—or parts thereof—in the SUT, and combining the configuration information with static information, for dragging from the static information the information relating to the SUT. The static information describes general information about the SUT, and/or possible components of the SUT, and/or tests applicable for the SUT, and/or relations therebetween.

9 Claims, 1 Drawing Sheet

Fig. 1

SYSTEM MODEL DETERMINATION FOR FAILURE DETECTION AND ISOLATION, IN PARTICULAR IN COMPUTER SYSTEMS

BACKGROUND OF THE INVENTION

The present invention relates to monitoring, detecting, and isolating failures in a system, and in particular to tools, such as a model of the system, applied for analyzing the system.

Quick and easy determination of failure causes (i.e. failure diagnosis) is a key requirement for providing services like time-to-fix contracts to information technology (IT) departments.

In current solutions, a specially trained engineer is typically requested to go on-site in case a (customer's) system breaks down. There, s/he may then use software tools to search for the root cause of the system crash. This software is typically a collection of test programs testing parts of the system undertest (SUT). The engineer selects a couple of tests based on experience from previous cases or may choose to run a complete test suite. This requires a reboot of the SUT, thus reducing system up-time from the customer's perspective. In addition, this approach requires the SUT being functional to a certain degree, so that a minimal operating system, like DOS, is bootable. Otherwise, the engineer is left to his experience.

This conventional approach has several drawbacks. First, it is a manual process. Simple test suites could be defined, but detailed testing is only done on sub-systems that the engineer suspects may cause the problem. Secondly, the SUT has to be rebooted to run the tests. In cases where the system has regained a productive state, this lowers system uptime. Thirdly, conventional test suites check for a list of potential failure causes. This implies that failure causes unknown to the test suite will never be detected. Expert systems show a way out of these problems.

Expert systems have been used for diagnosing computer failures, as described e.g. by J. A. Kavicky and G. D. Kraft in "An expert system for diagnosing and maintaining the AT&T 3B4000 computer: an architectural description", ACM, 1989. Analysis of data from on-bus diagnosis hardware is described in Fitzgerald, G. L., "Enhance computer fault isolation with a history memory," IEEE, 1980. Fault-tolerant computers have for many years been built with redundant processing and memory elements, data pathways, and built-in monitoring capabilities for determining when to switch off a failing unit and switch to a good, redundant unit (cf. e.g. U.S. Pat. No. 5,099,485).

Prior diagnostic systems for determining likely failed components in an SUT include model-based diagnostic systems. A model-based diagnostic system may be defined as a diagnostic system that renders conclusions about the state of the SUT using actual SUT responses from applied tests and an appropriate model of correct or incorrect SUT behavior as inputs to the diagnostic system. Such a diagnostic system is usually based upon computer generated models of the SUT and its components and the diagnostic process.

It is usually desirable to employ a model-based diagnostic system that is based upon a more manageable model of SUT characteristics. Such a model-based diagnostic system usually minimizes the amount of modeling information for an SUT that must be generated by a user before the system can be applied to the SUT. Such modeling usually speeds the process of adapting the diagnostic system to differing SUTs and increases confidence in the determinations rendered by the diagnostic system.

Model-based diagnostic systems are known e.g. from W. Hamscher, L. Console, J. de Kleer, in 'Readings in system model-based diagnosis', Morgan Kauffman, 1992. A test-based system model is used by the Hewlett-Packard HP Fault Detective (HPFD) and described in HP Fault Detecfive User's Guide, Hewlett-Packard Co., 1996.

U.S. Pat. No. 5,808,919 (Preist et al.) discloses a model-based diagnostics system, based on functional tests, in which the, modeling burden is greatly reduced. The model disclosed in Preist et al. employs a list of functional tests, a list of components exercised by each functional test along with the degree to which each component is exercised, by each functional test, and the historical or or estimated a priori failure rate for individual components. Such model data may be rapidly and easily determined- or estimated by test engineers, test programmers or others familiar with, but not necessarily expert on, the device under test. Typically, test engineers may develop the models in a few days to a few weeks depending on the complexity of the device under test.

U.S. Pat. No. 5,922,079 (Booth et al.) discloses an automated analysis and troubleshooting system that identifies potential problems with the test suite (ability of the model to detect and discriminate among potential faults), and also identifies probable modeling errors based on incorrect diagnoses.

EP-A-887733 (Kanevsky et al.) discloses a model-based diagnostic system that provides automated tools that enable a selection of one or more next tests to apply to a device under test from among the tests not yet applied based upon a manageable model of the device under test.

In the above three model-based diagnostic systems, a diagnostic engine combines the system-model-based and probabilistic approaches to diagnostics. It takes the results of a suite of tests and computes—based on the system model of the SUT—the most likely to be failed components.

The diagnostic engine can be used with applications where a failing device is to be debugged using a predetermined set of test and measurement equipment to perform tests from a predesigned set of tests. A test represents a procedure performed on the SUT. A test has a number of possible outcomes.

The tests can be defined to have only two outcomes: pass or fail. For the purpose of this invention, devices or components shall be regarded as either "good" or "bad" and tests shall either "pass" or "fail". In an example, a test for repairing a computer may involve checking to see if a power supply voltage is between 4.9 and 5.1 volts. If it is, the test passes. If it is not, the test fails. The set of all tests available for debugging a particular SUT shall be called that SUT's test suite.

Using test results received from actual tests executed on the SUT and the system model determined for the SUT, the diagnostic engine computes a list of fault candidates for the components of the SUT. Starting, e.g., from a priori failure probabilities of the components, these probabilities are then weighted with the model information accordingly if a test passes or fails. At least one test has to fail, otherwise the SUT is assumed to be good.

In all the known model-based diagnostic systems, in particular the provision of the system model has been proved difficult, specifically in rather complex systems. One reason is that for each system an individual system model has to be 'created' which generally cannot be used even for only slightly different systems. Furthermore, the modeling process turns out to be a rather costly process, on one hand since the modeling is a manual process, and, on the other hand, since this manual process requires highly educated and therefore expensive personnel.

SUMMARY OF THE INVENTION

It is therefore an object of the present invention to facilitate the provision of system models to be applied in model-based diagnostic systems. The object is solved by the independent claims. Preferred embodiments are shown by the dependent claims.

The invention provides an improved tool for determining a system model describing a relation between applicable tests and components of a system under test (SUT). The system model can then be applied in conjunction with actual test results for determining at least one fault candidate representing a specific component of the SUT likely to have caused a fault or failure of the SUT. Each fault candidate is preferably provided with a certain probability that the component has caused the failure. The fault candidates can be preferably represented in a probability-ranked list. Thus, the invention can be applied in diagnosis tools allowing to detect any kind of system failures—hardware, configuration, and software—based on the system model and a series of tests.

According to the invention, a logical inference engine determines the system model for the system under test (SUT). The system model can be one of the test-based system models as described in the introductory part. It is to be understood that the invention is not limited to a specific type of system model required for a specific diagnosis application, but can be applied for a wide variety of different system models.

Typical features of the system model can be, either together or individually:

A system definition assigning an identification/reference (such as a name and/or an address) to each component of the system, preferably in a multiple level (preferably two levels) part-whole hierarchy comprising names of the components (typically field-replaceable units FRUs or block level units) and of their subcomponents. It is to be understood that even though the system diagnosis can be accomplished/executed on the lowest level of the hierarchy of system components (in order to achieve highest accuracy), the result of the diagnosis is preferably provided and output only on the highest level of the hierarchy of system components (in order to provide a more concise result with highest understandability).

A failure probability for each component, gained e.g. from experience or quality tests provided e.g. from the manufacturer of the components. The failure probability represents the probability that a specific component will fail. The failure probabilities are applied for assessing the relationship between test results and components. The failure probabilities might represent quantitatie values, such as x% failure probability, and/or typical qualitative failure probabilities of the components, e.g. in away describing that component A fails twice as often as component B. A priori failure probabilities can be provided as starting values and might, be refined/modified over the time, e.g. dependent on newly acquired information about actual failure probabilities of the components or in accordance with foreknowledge of how failure probabilities vary, over time. The a priori failure probabilities might be assumed to be the maximum values (e.g. the a priori failure probability is set to be 1 or 100%) for new or unknown components, and will then be refined during the course of the testing procedure.

A test definition assigning an identification/reference (such as a name) to each applicable test. Further information about the content, modalities, characteristics, and execution of tests might also be comprised by the test definitions.

A coverage that each test has on each component, i.e., the proportion of the functionality of the component that is exercised by the test, or more formally, the conditional probability that the test will fail given that the component is bad. The coverage describes the amount of functionality of a component required to pass a specific test. In other words, when the specific test has been executed without failure, whereby a number of components have been involved in the test, the coverage denotes how much (e.g. which percentage) of each component involved must be functional since the test has passed. In an example, an access on a memory involves the memory, a memory bus and a controller. To pass an access test of the memory would require e.g. 30% functionality of the memory (since the memory will be tested only partly), 90% functionality of the memory bus (since most signals of the memory bus are required to transmit the respective data), and 50% functionality of the controller (since only a part of the controller is involved for accessing the respective part of the memory).

Shared functions of tests, which are a way of system-modeling tests that are dependent because they test the functionality of some components in (substantially or exactly) the same way. For example: two tests that access a certain component through a common cable have shared coverage on the cable. In other words, the shared, function denotes that a specific component is tested in plural tests in (substantially) the same way. The shared function may relate to individual components (e.g. the shared function of the memory is x% in all tests generally involving the memory) or to certain types of tests (e.g. the shared function of the memory is y% in all tests involving a write access on the memory). In the above example applied e.g. for two different memories A and B, both memory tests apply 70% functionality of the memory bus in an identical manner, so that of the shared coverage on the memory bus is 70%.

In most system models, the system and test definitions together with the coverages represent the most important information, which has to be there right from the beginning of the tests. The failure probabilities can be defined or assumed almost arbitrarily and can be refined successively. The shared functions represent optional information for most system models, however, useful for providing more meaningful diagnosis results.

For determining the system model for a specific SUT, the logical inference engine applies static information and/or configuration information. Static information describes general information about the SUT, and/or possible. components of the SUT, and/or tests applicable for the SUT, and might further describe relations therebetween. Configuration information, in contrast thereto, describes the actual set of components, in the SUT.

Static information can be gathered e.g. from one or more of the following sources (which might also be referred to as databases, lists or the like):

Static SUT knowledge comprising general information about the general system type of the SUT, independent of the specific setup of the actual SUT. The static SUT knowledge might comprise a set of rules applicable to the supported hardware platforms and architectures. (e.g. Intel-based systems). These rules may describe e.g. data paths between component classes (e.g. system memory and PCI cards or CPU), and might define relationships between functional units and FRUs, e.g. the functional components placed on a specific FRU. The static SUT knowledge might comprise generic definitions of components, e.g. like the generic behavior of PCI or SCSI devices.

Static component knowledge comprising general information about possible components applicable in the SUT, independent of the specific component setup of the actual SUT. The static component knowledge preferably comprises failure probabilities, and might also (instead of or in addition to the static SUT knowledge) comprise generic definitions of components.

Static test knowledge comprising general information about possible tests executable on or applicable in the SUT, independent of the specific tests actually executed/applied for the actual SUT. Each test available is listed in this database. The static test knowledge preferably comprises the coverages and/or shared functions associated to each component.

Configuration information describes the actual set of components in the SUT. The configuration information is preferably directly acquired from the SUT to be diagnosed e.g. by an adequate acquisition unit (i.e. a device capable of reading the desired information) or defaulted, e.g. with information derived from the static SUT knowledge. Actual components present in the SUT can be identified e.g. by, applying scanning algorithms and/or by using the SUT knowledge (e.g. since some components 'simply have to be there'). Different algorithms can be implemented for scanning busses in the SUT, like PCI bus, SCSI bus, USB etc.

The acquisition of the configuration information can be performed in an iterating and/or refining process, e.g. applying a first scanning for components preferably starting with sub-systems closest to the unit(s) acquiring the configuration information, e.g. the PCI bus as a common top-level bus system. During this first scanning, bridges to sub-systems lower in the SUT hierarchy can be detected eventually, thus leading to a second component scanning, e.g. of the SCSI bus. The second scanning can be done by the same acquisition units or new adequate devices found by previous scanning iterations. This procedure is preferably repeated until no more new sub-systems are found in the SUT.

The scan results are preferably correlated with the static component knowledge, either once the scanning has been finished or as an ongoing process during the scanning. The configuration information might comprise a list of FRUs that users can add, like memory and add-in cards, or data read from system internal structures.

In accordance with the system definition (cf. the above said), the configuration information comprises a unique identification for each component for clearly identifying and distinguishing between each of the components of the configuration information. The identification can be accomplished by assigning a device identifier and an address to each component of the SUT. The device identifier describes the (generic) component class, thus allowing to differentiate e.g. between a hard disk (as one generic component class) and a CDROM drive (as another generic component class) located on a SCSI bus. The address then allows distinguishing between two hard disks (of the same generic component class), whereby one has the address A and the other has address B. The address preferably uses or equals the system address of the component in the SUT.

The configuration information can be stored (at any time during or after the modeling process) as reference data. When the configuration information is reacquired during the course of the monitoring to the SUT, any difference from this reference data can then also be interpreted as a diagnostic result. E.g., a missing component (i.e. a component defined by the reference data as being present in the SUT, which has been removed from the SUT after setting up the reference data) can be interpreted as a total failure of this component. In addition, many systems react to defective components by configuring certain related components slightly differently, e.g. by disabling bad sectors of a hard disk or disabling data transfer optimizations in controllers, to bypass the problem. This further shows that the configuration information used for building the system model of the SUT can be applied twice: for modeling purposes first and then for comparison with information about the components gathered after storing the reference data.

The reference data can be applied as a 'known-good' reference representing a state wherein the SUT has been proved to be functional. It is clear that the reference data itself can also be subject to modification(s) during the course of monitoring the SUT.

For determining the system model of a specific SUT, the configuration information is combined with the static information for extracting, from the static information, the information that is required (only) for the specific SUT. In a diagnosing operation mode, i.e. when the SUT and the diagnosing system have already been set up, the configuration information is taken preferably from the reference data. This would result in an equal model for several diagnoses. However, the model-building procedure also works on recently gathered, configuration information. Dependent on the degree to which the, configuration information has already been gathered from the SUT, at the time of the model-building procedure, the model-building procedure can be accomplished by one or more iterating steps. This procedure has to be chosen if no reference data is available.

In case that—at the time of the model-building procedure—the configuration information has already been fully or at least sufficiently gathered from the SUT (or reference data is available), a logical inference engine provides for the components of the configuration information a list of component instances defined by the device identifier and the system address. The term 'list' as used. herein does not necessarily mean a list in form of a table or the like, but can apply to any kind of data association as provided e.g. in data processing units.

The component instances of the list of component instances (from the configuration information) are then combined with the static information in order to find further components in the SUT which might not have been identified in the scanning process for determining the configuration information. Such further components can be, for example, components that have to be present (as defined e.g. by the static SUT and/or component knowledge) in a functional SUT but cannot or have not yet be detected, such as batteries, connectors or cabling.

Using the static information, the list of component instances is then associated with:

one or more tests (as defined by the static test knowledge) covering at least one component of the list of component instances, the coverages (as defined by the static test knowledge) assigned for each component of the list with respect to a specific test, and the failure probabilities (as preferably defined by the static component knowledge) assigned for each component of the list.

The selected tests can then be associated with the shared function information, dependent whether shared functions are applied in the system model or not.

The list of component instances associated with the above further information represents a matrix of the system model, whereby, again, the term 'matix' as used herein does not necessarily mean a matrix in form of a more or less complex table or the like, but can apply to any kind of data association as provided e.g. in data processing units.

The one or more selected tests can be applied as a test suite for diagnosing the SUT.

It is to be understood that the configuration information does not represent a fixed or static source of information but can also be subject of ongoing modifications e.g. under the influence of further executed tests. Accordingly, the determined model need not represent a static model, which after having been determined will remain 'as is'. The determined system model can also be subject of ongoing modifications under the influence of newly gathered information e.g. from executing the selected tests. For the sake of simplicity, however, the configuration information shall be regarded as finalized at a certain moment, e.g. once a test suite with a sufficient number of tests has been selected. Accordingly, the system model may also be regarded as finalized at the same time.

In a preferred embodiment, the above-described model building process is executed in a series of steps. In a first step, the list of component instances, defined by their device identifier and their system address, is formed. In a second step, a matrix of coverages is formed, wherein one axis of this matrix is defined by the list of component instances. This process has to take care to define a coverage in that way that one coverage is defined for each instantiated component. For the two hard disks A and B this would mean that two coverages would be associated with hard disk tests X and Y, where test X tests hard disk A while test Y tests hard disk B. This process may also take into account that testing a component Z from a data acquisition unit U implies a certain coverage on all components implementing the data path from U to Z or Z to U, like busses, connectors, cables, or bridging devices. All these components, again, might imply coverage on secondary components enabling these primary components to operate, like batteries or power supplies. In a third step, a list of tests is formed, which is simply the other axis of the coverage matrix, i.e. all tests that are found to have coverage on any component in the SUT are members of this list.

In case that—at the time of the model-building procedure—the configuration information has not been fully or at least sufficiently gathered from the SUT, the process for determining the system model as outlined above can be repeated iteratively, until the configuration information has been fully or at least sufficiently gathered.

The thus determined system model can then be applied in any one of the model-based diagnostic systems as outlined in the introductory part of this specification. It is, however, to be understood that the system model determining process has to be adapted to each respective model-based diagnostic system, since each of those diagnostic systems might require the system model in a specific data configuration and form. In addition, each diagnostic system might require different features of the system model, such as additionally requiring shared functions.

The system-modeling scheme according to the invention brings a couple of advantages. The system model can be determined automatically without requiring manual aid, since all relevant information is already provided by the static and configuration knowledge Although a certain (in most cases mainly manual) effort will have to made in advance for providing the static information, this can be done on a very general base for a, variety of different systems in common. Thus, the invention is in particular useful for diagnosing a plurality of similar system, each system, however, requiring a (slightly) different system model.

The system model determining process according to the invention further represents an open process that allows a more or less continuous refinement and/or actualization of the system model. Thus, only little (configuration) information is required for the very beginning of a diagnosis process.

The invention further allows enhancing the system model even on components that cannot or only hardly be detected by actually scanning the SUT. Moreover, the use of reference data even allows finding problems in not or only little known components, as simply the difference from the reference data indicates problems somewhere in the SUT.

The tests of the test suite to be executed on the SUT can be more specifically selected for the SUT, since the tests are chosen dependent on the actual configuration. When designing tests, only little care has to be taken on general applicability. Strict parameter ranges can be specified instead of going for the least common denominator. E.g., a hard disk controller supports two different modes, like performance mode and secure data mode, but for one particular system it is always operated in the one and same mode. In this case, a test is written preferably for this controller in this particular mode. The other mode is neglected for this system.

Therefore, the definition of tests becomes simpler than in conventional approaches by cutting complex tests in small, easily manageable units.

Preferably, a first test would detect the mode of the component whereas a second test would be defined especially for this mode. The previously described model building process would then take care of selecting the correct second test. The cost of having more tests to write pays off because of an orthogonal set of test features (not overlapping, unambiguous) and a probable reduction of total test execution time.

It is clear that the invention can be partly or entirely embodied by one or more suitable software programs, which can be stored on or otherwise provided by any kind of data carrier, and which might be executed in or by any suitable data processing unit.

BRIEF DESCRIPTION OF THE DRAWINGS

Other objects and many of the attendant advantages of the present invention will be readily appreciated and become better understood by reference to the following detailed description when considering in connection with the accompanied drawing(s). Features that are substantially or functionally equal or similar will be referred to with the same reference sign(s).

DETAILED DESCRIPTION OF THE INVENTION

Figure 1:
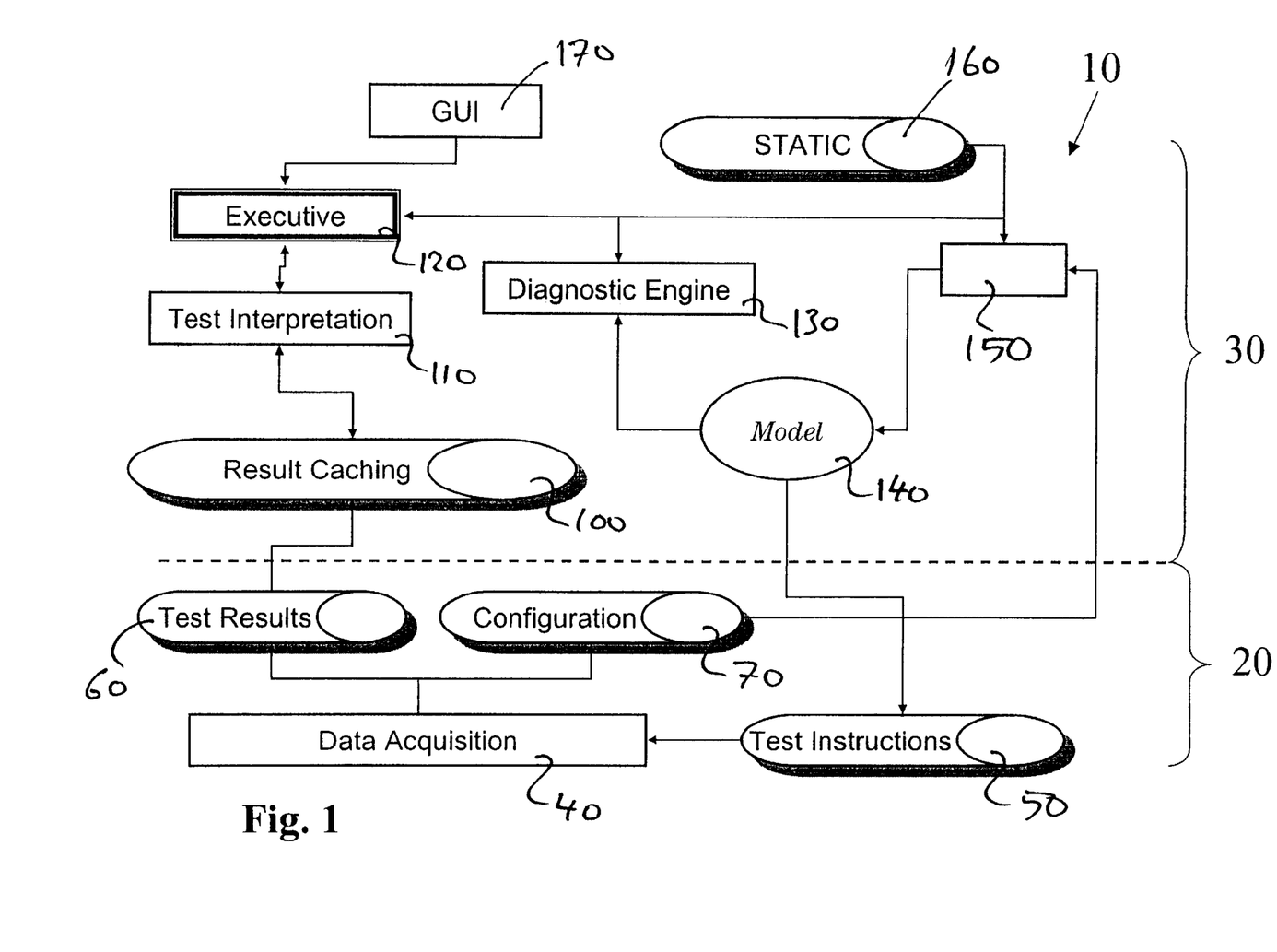
FIG. 1 depicts a model based diagnosis system 10 according to the invention.

FIG. 1 depicts in a generalized block architecture an example of a model based diagnosis system 10 according to the invention, which is particularly suited for failure diagnosis of computer systems. The diagnosis system 10 comprises a test data gathering unit 20 and a test data evaluation unit 30. In the representation of FIG. 1, the test data gathering unit 20 comprises the features below the dotted line, while all features above the dotted line belong to the test data evaluation unit 30.

The test data gathering unit 20 comprises a data acquisition unit 40 for executing tests on the system under test (SUT) to be tested by the diagnosis system 10. The tests to be executed are stored in a test instruction memory 50 coupled to the data acquisition unit 40 and providing the required test data thereto. Test results received from tests actually performed on the SUT are stored by the data acquisition unit 40 in a test result memory 60. The test data gathering unit 20 might further comprise an inventory storage 70, wherein inventory data about the SUT can be stored, such as (recently gathered or already determined reference) configuration information (cf. summary of the invention) describing the actual set of components in the SUT. While the shown inventory storage 70 shows a decentralized approach, a centralized database connected to the data gathering unit 20 will result in an equivalent diagnostic system. The inventory data can be received using scanning algorithms as known in the art (cf. summary of the invention).

The test data gathering unit 20 is preferably implemented by an automated data acquisition system, such as the Agilent E6121A Remote Management Card as a hardware platform to provide access mechanisms and storage. This allows that test data of significant diagnostic value can be generated by the SUT during critical phases, e.g. during the boot phase of a PC.

The test instruction memory 50 contains the test instructions that the data acquisition unit 40 has to execute to provide the test data needed to do the diagnostic on all components found in the SUT. The test instruction memory 50 preferably comprises the test instructions in a list of data with a list entry for each test to be executed. The test instructions are preferably generated during an installation time of the test data gathering unit 20, as will be explained later.

The test data evaluation unit 30 comprises a test data cache 100 for reading the test data from the test result memory 60 of the test data gathering unit 20, whenever diagnostic of the SUT is requested, e.g. by a user or according to a predefined diagnostic schedule. A test interpretation unit 110 transforms the (raw) test data from the test data cache 100 into pass/fail criteria, so that the result of each executed test is either pass or failed.

An executive 120 provides the transformed test data from the test interpretation unit 110 to a diagnostic engine 130 to compute a diagnostic result based on the transformed test data and a system model 140 of the SUT. The system model 140 describes a relation between the tests and the components of the SUT. The system model 140 is generated by a prolog interpreter 150 using a static information 160 (cf. summery of the invention) and the inventory data about the SUT from the inventory storage 70. The static information 160 describes general information about the SUT, and/or possible components of the SUT, and/or tests applicable for the SUT, and might further describe relations therebetween.

The executive 120 is to be understood as a building block that has knowledge about the different components. Preferably, it receives commands from a graphical user interface (GUI) 170 or other user interface or through integration with other program(s), application(s), or device (s) such as an automatic management application that manages the required actions. In this case:

Build the system model 140.

Execute the tests instructions 50 or load up the test results in the case that the gathering unit 20 is intelligent enough to execute test instructions 50 itself, and pass the test results 60/100 via the test interpretation unit 110 to the diagnostic engine 130.

Ask the diagnostic engine 130 to compute the diagnostic result.

Send the diagnostic result back to command initiator (e.g. the graphical user interface 170).

The provision of individual test data cache 100 and test result memory 60 for storing the test data allows separating the test data gathering unit 20 and the test data evaluation unit 30, e.g. as independent physical units. The tests data gathering unit 20 can collect the test data substantially independent of the test data evaluation unit 30, and write the test results into the test result memory 60. When the data evaluation unit 30 'wants' to start diagnosing, the test data cache 100 will read out the currently collected test data as the content of the test result memory 60. This data caching, while being connected to a (functionally) independent test data gathering unit 20, is preferably provided to improve speed while the user is working. It is clear, however, that the test data cache 100 and the test result memory 60 could be combined to one (physical) storage only.

Diagnosing and interpretation of test results starts with the provision of a system model for the SUT. The Prolog inference engine 150 is used to do the system modeling. Prolog was choosen as the most convenient computer language for expressing the rules relating configuration information to the system model of the SUT. Other computer languages are also suitable for this task. Different choices of computer language will have relative advantages and disadvantages that will be apparent to those skilled in the art. The system model is preferably created every time the diagnosis system 10 is started up This eliminates the need of large SUT specific storage (such as a diagnostic profile) and makes it easy applicable to a large amount of SUTs.

The system modeling shall now be explained in a very simplified manner. Table 1 depicts an example of the static information 160, as stored in the test data evaluation unit 30. Table 1, in words, describes that a test T1 would have a coverage of 60% on a component C1 and 10% on a component C2. A test T2 would have a coverage of 5% on the component C1, 80% on a component C3, and 20% on a component. C4, and so on In other words, the component C4 would have a coverage of 20% in the test T2 and 5% in a test T5, and so on.

It shall now be assumed that the inventory storage 70 comprises, as configuration information, a sufficiently complete set of components actually be present in the SUT, namely the components C2, CS and C6. Table 2 shows the same content of Table 1, however with a marking of the components C2, C5 and C6, and the respective coverages thereof. As apparent from Table 2, the components C2, C5 and C6 have coverages in the tests T1 and T3–T5, but no coverage in test T2. Therefore, only the tests T1 and T3–T5 need to be selected as a test suite applicable on the SUT, and, the corresponding information about those tests will be provided as test instructions to the test instruction memory 50. The configuration information is thus used to drag from the static information 160 only that information required for the specific SUT.

Table 3 shows a representation of the system model determined for the SUT based on the static information 160

(as partly shown in Table 1) in combination with the configuration information from the inventory storage 70. The system model further comprises failure probabilities for each component, as apparent from the first column (components) in Table 3. In this example, the component $C_2$ shall have a failure probability $P_{C2}$=35%, the component $C_5$ has a failure probability $P_{C5}$=20%, and the component $C_6$ has a failure probability $P_{C6}$=10%. The failure probability represents the probability that a specific component will fail. The failure probabilities are also stored (preferably for all applicable components in the SUT) in the static information 160.

While the table representation of Tables 1–3 is mainly intended for easier demonstrating the principles of the invention, the internal data representation preferably is a more abstract list of statements, where each statement represents a field in the matrix. In the language of a Prolog inference engine (cf. e.g. Prolog, Programming for Artificial Intelligence, Ivan Bratko, Addison-Wesley, ISBN 0-201-41606-9), this could translate into:

This goal implements a relation between a test and a component and denotes the coverage at this point. The automatic backtracking of Prolog allows an easy query for all these statements given in a list of components. E.g. repetitively requesting the goal cov(my_test, Comp, Cov) from the Prolog interpreter would result in a list of component-coverage pairs associated with the test 'my_test'.

In case that the configuration information in the inventory storage 70 comprises only a limited number of components detected as being present in the SUT, the executive 120 will execute an iterating process for determining the system model 140. Following the above example, the initial setup of the configuration information only contains the component C2 (components C5 and C6 are also present but have not yet been detected in the SUT, and C2 is a bridging device to components C5; C6 is a component required by C2). Because of the presence of component C2, the prolog interpreter computes a system model containing one or more tests with coverage on C2. Derived from static component knowledge, this model would also contain the component C6, which can be assumed being there (e.g. a dedicated power supply). As C2 is a bridging device, one of these tests would be the instruction to scan the sub-system located behind C2 and store the results as configuration information.

For the second and all following steps of this process, either the new test instruction or all instructions, but at least those new test instructions that produce configuration information have to be executed, and a new model has to be computed. For the given example, the model would also contain component C6 as it has been added to the configuration information by a new test instruction and the according tests for this component.

The algorithm terminates preferably if an iteration step produces the same model as the previous step.

After the system model 140 has been determined, the corresponding information about the selected tests (the test suite) in the system model 140 will be provided by the executive 120, computed from the system model 140 and static test knowledge 160, as test instructions to the test instruction memory 50. The data acquisition unit 40 performs the selected tests on the SUT, and the corresponding test results are stored by the data acquisition unit 40 in the test result memory 60.

When a diagnosis of the SUT is to be performed, the test data evaluation unit 30 reads out the test data from the test result memory 60 into the test data cache 100. The test data is then transformed by the test interpretation unit 110 into pass/fail criteria. The transformation and interpretation algorithms are typically highly component-specific and/or depend on the method the raw test data was acquired. In some cases, tests can be defined as the comparison with reference data found in the inventory storage 70, where a match evaluates to pass and a mismatch to false. Other tests are preferably defined based on the specifications of sub-systems, like PCI or SCSI, that are reflected in the static SUT knowledge, e.g. configuration of devices (PCI configuration header, SCSI inquiry protocol). This description illustrates that tests are preferably defined starting with a generic approach, and then adding more specific tests as the component knowledge increases.

The diagnostic engine 130 finally determines a diagnostic result from the transformed test data in combination with the system model 140 of the SUT. For the above example, a possible diagnostic result could look like as depicted in Table 4. In words, this diagnostic result would indicate that the reset controller (as component C2) is the most likely failure candidate with a failure likelihood of 63%. Less likely, but still failure candidates are the PCI Bus 0 (as component C6) with a failure likelihood of 35% and the PCI Bus 3 (as component C5) with a failure likelihood of 12%. It is noted that likelihood generally denotes a value that behaves similar to a probabilistic value but is not such. Preferably, the likelihoods are normalized to sum up to one to be easier legible for the end user. The term 'failure candidate' means that the respective component is likely to have caused a failure in the SUT.

The modeling step can be regarded as the starting point of every diagnostic. Modeling is, done preferably every time from a reference data to react flexibly on modifications in the SUT. The reference data is preferably received from stored entries in the inventory storage 70. However, the once determined system model 140 can also be stored and then fetched back for further diagnosis.

The determination of the system model 140 shall now be illustrated in a more complex example of a personal computer PC. A part of the static information 160 is visualized by Table 5 showing that a certain number of components (left column) and a certain number of components (top row) are known to the diagnosis system 10. The parameter X of some components denotes that an arbitrary number of individual components of that component class can be modeled.

In the language of a Prolog inference engine, the above matrix would translate into the following set of predicates:

component(cCDROM(X)).
   typeOf(cCDROM(X), cdrom_type).
component(cHDD(X)).
   typeOf(cHDD(X), hdd_type).
component (cScsiController).
   typeOf(cScsiController, scsi_cntrl_type) . . .
test (tCDROMTest(X)).
   cov(tCDROMTest(X), C, 0.9) :—typeOf(C, cdrom_type).
   cov(tCDROMTest(X), C, 0.4) :—typeOf(C, scsi_cntrl_type).
   cov(tCDROMTest(X), C, 0.5) :—typeOf(C, scsi_cabling_type) . . .
test(tHDDTest(X)) . . .

The 'cov( )' predicates have to be read as follows: The coverage of the test (first parameter) on the component C is equal to the third parameter (e.g. 0.9), if (expressed by the ':—' characters) the following statement-evaluates to true. This is, e.g. for the first coverage predicate, the case for any component that is of the CD-ROM type. In this case, the variable 'C' is translated into this component. The inference engine takes care of evaluating this expressing as often as necessary.

Configuration knowledge received from the inventory storage 70 is used to determine which components are located at what addresses in the system. In an example, the SUT shall have the following components:

a hard disk at address x1, a hard disk at address x2, a CD-ROM at address x4, and according controllers and cabling.

This would transform the coverage matrix into the form as shown in Table 6. Relevant coverages are marked with a bold face, irrelevant information is gray shaded. The SCSI device row would expand into three rows according to our example and is omitted for readability.

This information becomes part of the configuration information stored in the inventory 70 and has to be made known to the inference engine 150. With a Prolog engine one would preferably assert statements or add program lines dynamically to the already loaded program, i.e. the static knowledge 160 loaded into the inference engine. This action is preferably a task of the executive 120. The following sample code illustrates this:

harddisk(x1).

harddisk(x2).

cdrom(x4).

The previous sample code then actually has to be slightly more complex to react on the configuration statements:

component(cCDROM(X)) :—
   cdrom(X).
   typeOf(cCDROM(X), cdrom_type) :— component(cCDROM(X)).
component(cHDD(X)) :—
   harddisk(X).
   typeOf(cHDD(X), hdd_type) :— component(cHDD(X)).

Preferably, even a more complex way of passing configuration knowledge to the inference engine 150 is chosen. The following Prolog statements illustrate this:

scsi_device(harddisk, x1).

scsi_device(harddisk, x2).

scsi_device(cdrom, x4).

With doing so, e.g. the following configuration information is passed to the inference engine 150: There exists a SCSI device of type hard disk at address one in the system, an identical device at address 2, and so on. The format of these statements is arbitrary and may contain any suitable number of parameters. Preferably, the most common property of a detected component should become the functor of these statements, like scsi_device in this example. In addition, this notation allows defining generic tests on SCSI devices by ignoring the type information. Dedicated tests for these types are then added to increase coverage on the components. The static knowledge program 160 has to be adjusted to these statements.

The implicit coverage on data path components that are logically located between a test initiator, e.g. the data acquisition unit 40 itself or other suitable devices of the SUT itself like the CPU in a PC system, and the component under test CUT for a given test can in may cases also be computed by the inference engine 150. In a Prolog implementation of the inference engine 150, the static SUT knowledge 160 would preferably contain statements like:

connectedto(A, B).

This statement would tell the inference engine 150 that there exists a path allowing data to be transferred from component A to component B, where A and B are two components of the SUT that are included in the system model 140. This statement could be defined in a more abstract way like:

connectedTo(cScsiCabling, C) :—
   component(C),
   typeOf(C, scsi_device_type).

Formulated like this, the connectedTo statement says that there is a connection from the SCSI cable component to any component on the SCSI bus. This method is preferably extended to all logical connections in the SUT, which results then in a true topology model of the SUT architecture. Preferably, a goal like:

path(U, Z, X). p is defined in the static SUT knowledge 160 that answers the question if a component X is logically located on the directed path from component U to component Z.

The previous example of testing a SCSI device shall now be refined. In this example, there is a given test that tests a SCSI hard disk from the CPU as test initiator. In a Prolog implementation of the inference engine 150 this would look as follows:

test(tHddTest(X)).
   cov(tHddTest(X), cHdd(X), 0.7).
   cov(tHddTest(X), cCpu, 0.3).
   cov(tHddTest(X), C, 0.5) :—
     path(cCpu, cHdd(X), C),
     component(C),
     not(eq(C,cHdd(X))),
     not(eq(C, cCpu)).

The last coverage rule puts a medium coverage value on all components on the path from the CPU to the hard disk and explicitly excludes the latter components as they are already counted once. It must be noted that the coverages are examples only, their value depends on the actual implementation of the test. It must further be noted that the given program is slightly simplified, as any goal should verify the existence of the components it is referring to.

For some SUTs, data paths are a good example for using shared coverages. The above example may be modified to the following:

test(tHddTest(X)).
   cov(tHddTest(X), cHdd(X), 0.7).
   cov(tHddTest(X), cCpu, 0.3).
   useSf(tHddTest(X), sfCpuToScsi)

In this example, the implicit coverages are combined to the useSf (use shared function) statement, saying that the model should include the shared coverages defined under the sfCpuToScsi goal. These shared coverages contain all components from the CPU to the SCSI bus. The goal is preferably defined using the same path goal as in the example above.

Required components may be defined using the same connectedTo statement. A typical characteristic of required or hidden components is that they have a connection to the tested component but are not accessible from the test initiator, as the following sketch may show:

Data Acquisition→NV Memory←Battery

In this example some battery backed up non-volatile memory is to be tested, requiring a battery. Any failure in the memory itself could be a consequence of a failing battery and the model should reflect this. The test could be modeled as follows:

test(tNVMemTest).
  cov(tNVMemTest, cNVMem, 0.5).
  cov(tNVMemTest, C, 0.3) :—
    component(C),
    not(path(cDataAcquisitio, cNVMem, C)
    hiddenComponent(cNVMem, C).

The hidden component goal in this example preferably returns all components which have a connection to the NV memory, components on the test path are explicitly excluded.

At this point, the complete information for the system model 140 is available from the inference engine 150. The following pseudo-code illustrates how this required information could be queried:

1. find all components—the inference engine 150 returns only components according to the configuration information;
2. find all tests that have at least one coverage statement associated with—the coverage statement remains invisible if the according component is not known to the SUT;
3. loop over all components;
4. loop over all tests, nested;
5. for all component/test pairs, find the coverage value.

The list of tests is preferably stored in the test instruction storage 50 and can automatically be executed for the next diagnostic.

Storing reference data is a process that a user preferably does once during system configuration. This reference data consists of two parts, the configuration information, and an instruction set how to obtain this information. The following section sketches a system preferably used to automatically build a reference data set for the entire SUT.

In the following, only tests that acquire configuration relevant data are discussed. These tests can be split into two parts; one part gathers the information, while the second part is responsible for communicating this information to the inference engine. During the reference building phase, the communicating part operates on the data that the gathering part just has acquired from the SUT.

To start the algorithm, a SUT dependent default instruction set always has to be present in the system. In the above example, this test would be a SCSI scan algorithm. After the scan has been performed, the system model 140 for the diagnostic engine 130 is built. If this results in a modified system model 140 with respect to the previous iteration, e.g. a new bus hierarchy is detected, the model building process is repeated until the system model 140 does not change anymore. At this point the algorithm stops and all configuration data can be copied to the reference storage.

When a diagnostic is finally requested, the model will always be built from the reference configuration information.

TABLE 1

|       | $T_1$ | $T_2$ | $T_3$ | $T_4$ | $T_5$ |
|-------|-----|-----|-----|-----|-----|
| $C_1$ | 60% | 5%  | 30% |     | 5%  |
| $C_2$ | 10% |     | 30% | 5%  | 80% |
| $C_3$ |     | 80% |     | 20% |     |
| $C_4$ |     | 20% |     |     | 5%  |
| $C_5$ |     |     |     |     |     |
| $C_6$ |     |     | 30% |     |     |

TABLE 2

|       | $T_1$ | $T_2$ | $T_3$ | $T_4$ | $T_5$ |
|-------|-----|-----|-----|-----|-----|
| $C_1$ | 60% | 5%  | 30% |     | 5%  |
| $C_2$ | 10% |     | 30% | 5%  | 80% |
| $C_3$ |     | 80% |     | 20% |     |
| $C_4$ |     | 20% |     |     | 5%  |
| $C_5$ |     |     |     |     |     |
| $C_6$ |     |     | 30% |     |     |

TABLE 3

|                          | $T_1$ | $T_3$ | $T_4$ | $T_5$ |
|--------------------------|-----|-----|-----|-----|
| $C_2$ ($P_{C2}$ = 35%)   | 10% | 30% | 5%  | 80% |
| $C_5$ ($P_{C5}$ = 20%)   |     |     |     |     |
| $C_6$ ($P_{C6}$ = 10%)   |     | 30% |     |     |

TABLE 4

| Component               | Failure Likelihood |
|-------------------------|--------------------|
| $C_2$ (Reset Controller) | 63%               |
| $C_6$ (PCI Bus 0)        | 35%               |
| $C_5$ (PCI Slot 3)       | 12%               |

TABLE 5

|                   | SCSI Device (X) Test | CD-ROM(X) Test | HDD(X) Test | SCSI Controller (X) Test | SCSI Scanner Test | IDE Floppy Test |
|-------------------|-------|-------|-------|-------|-------|-------|
| CD-ROM(X)         | 20%   | 90%   |       | 5%    |       |       |
| HDD(X)            | 20%   |       | 50%   | 5%    | 5%    |       |
| SCSI Controller   | 40%   | 40%   | 60%   | 70%   | 40%   |       |
| SCSI Cabling      | 70%   | 50%   | 70%   | 20%   | 50%   |       |
| CPU               |       | 20%   | 25%   |       | 20%   |       |
| SCSI Scanner (X)  |       |       |       |       | 30%   |       |

TABLE 6

|                 | CD-ROM (x4) Test | HDD (x1) Test | HDD (x2) Test | SCSI Controller Test | SCSI Scanner Test | IDE Floppy Test |
|-----------------|-------|-------|-------|-------|-------|-------|
| CD-ROM(x4)      | 90%   |       |       | 5%    |       |       |
| HDD(x1)         |       | 50%   |       | 5%    | 5%    |       |
| HDD(x2)         |       |       | 50%   | 5%    | 5%    |       |
| SCSI Controller | 40%   | 60%   | 60%   | 70%   | 40%   |       |

TABLE 6-continued

|  | CD-ROM (x4) Test | HDD (x1) Test | HDD (x2) Test | SCSI Controller Test | SCSI Scanner Test | IDE Floppy Test |
|---|---|---|---|---|---|---|
| SCSI Cabling | 50% | 70% | 70% | 20% | 50% | |
| CPU | 20% | 25% | 25% | | 20% | |
| SCSI Scanner (X) | | | | | 30% | |

What is claimed is:

1. A method for determining a system model describing a relation between applicable tests and components of a system under test (SUT), whereby the system model is applicable in conjunction with actual test results for determining at least one fault candidate representing a specific component of the SUT likely to have caused a fault of the SUT, preferably provided with a certain probability that the component has caused the failure; the method comprising the steps of:

(a) determining configuration information describing the actual set of components, or parts thereof, in the SUT, and (b) determining the system model of the SUT by combining the configuration information with static information, for extracting from the static information the information relating to the SUT, whereby the static information describes general information about the SUT, and/or possible components of the SUT, and/or tests applicable for the SUT, and/or relations therebetween.

2. The method of claim 1, wherein steps (a) and/or (b) are iteratively repeated, preferably until no further possible components of the SUT and/or tests applicable for the SUT are determined for the system model.

3. The method of claim 1, wherein step (b) comprises a step of:

(b1) determining a set of component instances for the components of the configuration information, each component instance comprising a device identifier for uniquely identifying the component and a system address of the component in the SUT.

4. The method of claim 3, wherein step (b) further comprises a step of:

(b2) combining one or more of the component instances with the static information for determining further components present in the SUT which might not yet have been identified.

5. The method of claim 3, wherein step (b) further comprises the steps of:

(b3) combining one or more of the component instances with the static information for determining one or more tests covering at least one of the component instances, and (b4) combining one or more of the component instances with the static information for determining for each determined test a coverage that the test has on each of those component instances.

6. The method according to claim 5, wherein step (b) further comprises a step of:

(b5) determining one or more shared functions for the determined one or more tests, whereby each shared function denotes that a specific component or component instance is tested in plural tests in the same way.

7. The method according to claim 3, wherein step (b) further comprises a step of:

(b6) combining one or more of the component instances with the static information for determining a failure probability for each one of the one or more of the component instances, whereby each failure probability represents the probability that a specific component or component instance will fail.

8. A system for determining a system model describing a relation between applicable tests and components of a system under test (SUT), whereby the system model is applicable in conjunction with actual test results for determining at least one fault candidate representing a specific component of the SUT likely to have caused a fault of the SUT, preferably provided with a certain probability that the component has caused the failure, the system comprising:

static information describing general information about the SUT, and/or possible components of the SUT, and/or tests applicable for the SUT, and/or relations therebetween, and means for determining the system model of the SUT by combining the configuration information, describing the actual set of components—or parts thereof—in the SUT, with the static information, for dragging from the static information the information relating to the SUT.

9. The system of claim 8, wherein the static information comprises:

a static SUT database comprising general information about the general system type of the SUT, independent of the specific setup of the actual SUT, and/or a static component database comprising general information about possible components applicable in the SUT, independent of the specific component setup of the actual SUT, and/or a static test database comprising general information about possible tests executable on or applicable in the SUT, independent of the specific tests actually executed/applied for the actual SUT.

* * * * *